United States Patent

Staats

[11] 4,241,006
[45] Dec. 23, 1980

[54] METHOD FOR PRODUCING A TRANSVERSELY CURVED FINGER BINDING

[75] Inventor: Henry N. Staats, Deerfield, Ill.

[73] Assignee: General Binding Corporation, Northbrook, Ill.

[21] Appl. No.: 5,826

[22] Filed: Jan. 23, 1979

[51] Int. Cl.³ .......................... B29C 17/00; B29F 5/00
[52] U.S. Cl. .................................. 264/322; 264/323; 264/325; 264/339
[58] Field of Search ............... 264/320, 322, 295, 339, 264/160, 325, 316; 402/19, 22; 281/48, 21 A, 21 R; 11/1 A, 1 R; 425/383, 384, 391, 394, 402

[56] References Cited

U.S. PATENT DOCUMENTS

| | | | |
|---|---|---|---|
| 1,970,285 | 8/1934 | Douvry | 402/19 |
| 1,990,455 | 2/1935 | Kraft | 425/394 |
| 2,211,743 | 8/1940 | Nelson et al. | 425/89 |
| 2,211,744 | 8/1940 | Nelson et al. | 264/285 |
| 2,273,824 | 2/1942 | Barrett | 402/1 A |
| 2,304,629 | 12/1942 | Emmer | 425/391 |
| 2,491,528 | 12/1949 | Spinner | 264/339 |
| 2,608,700 | 9/1952 | Trussell | 402/22 |
| 2,676,360 | 4/1954 | Emmer | 425/391 |
| 2,686,932 | 8/1954 | Zaleski | 425/391 |
| 2,847,998 | 8/1958 | Pisano | 402/22 |
| 3,162,895 | 12/1964 | Pusch | 425/394 |
| 3,280,240 | 10/1966 | Bardy | 425/391 |

FOREIGN PATENT DOCUMENTS 509621 2/1955 Canada ...................... 402/19

Primary Examiner—W. E. Hoag
Attorney, Agent, or Firm—Hill, Van Santen, Steadman, Chiara & Simpson

[57] ABSTRACT

A method is disclosed for producing a longitudinally extending curved finger binding made of plastic material. The fingers are arched transversely to their longitudinal axis to provide an arched contour with a resulting increase in stiffness. A blank from which the binding is formed is heated to a temperature sufficient to soften the plastic blank. Fingers of the blank are curled and a backbone portion of the blank is curved into a closed circular plastic binding formation by use of a guide form. The guide form simultaneously curves each of the fingers transverse to their longitudinal axis.

4 Claims, 10 Drawing Figures

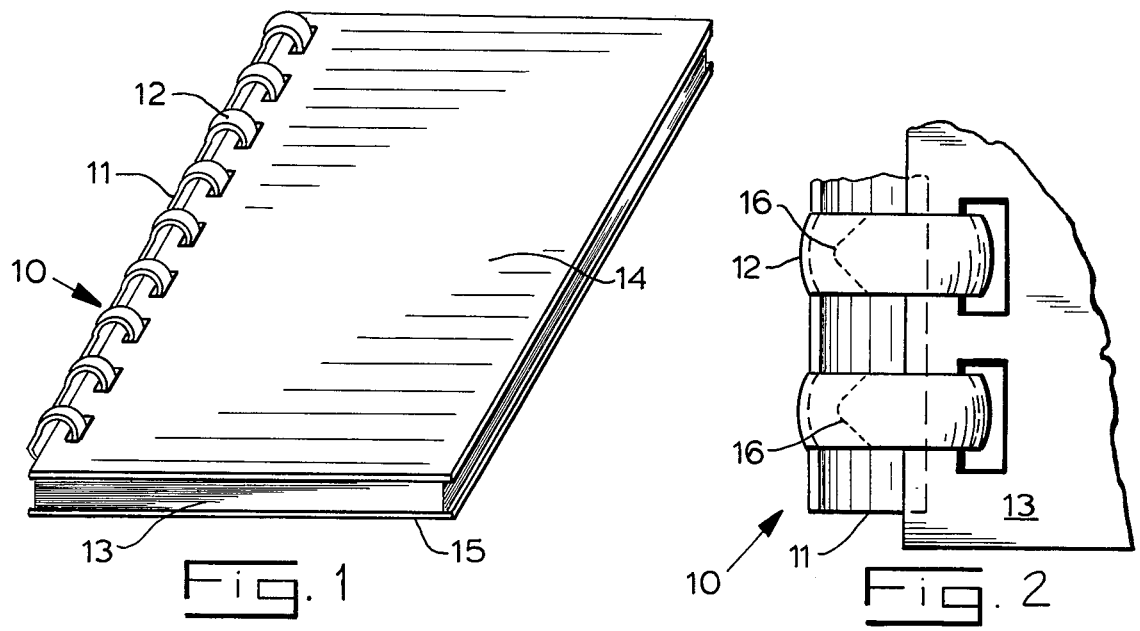
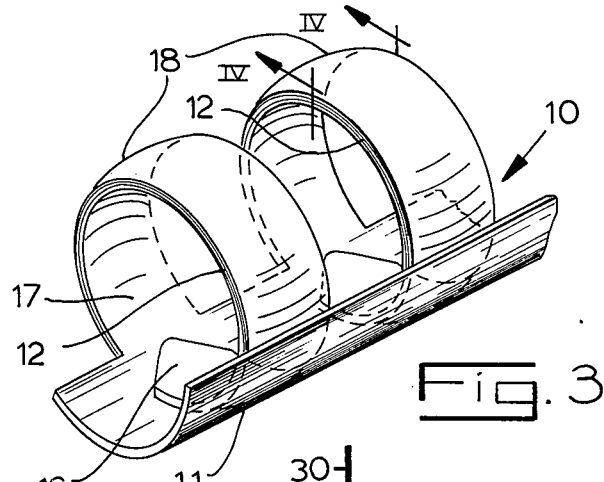
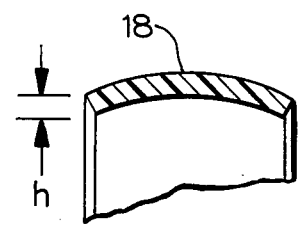
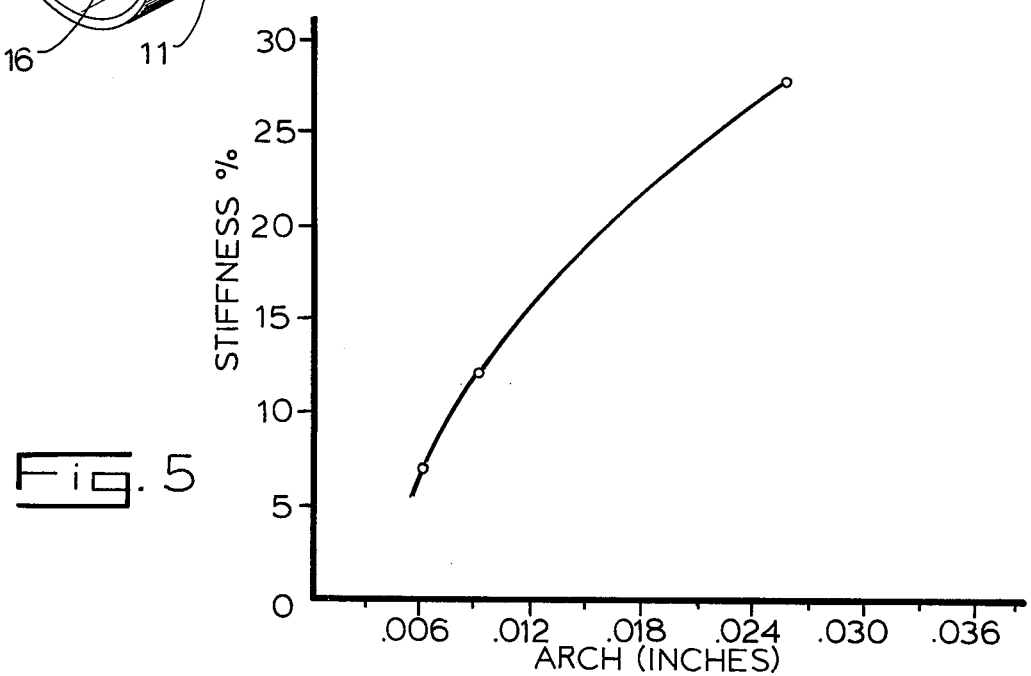
Fig. 1 Fig. 2 Fig. 3 Fig. 4 Fig. 5

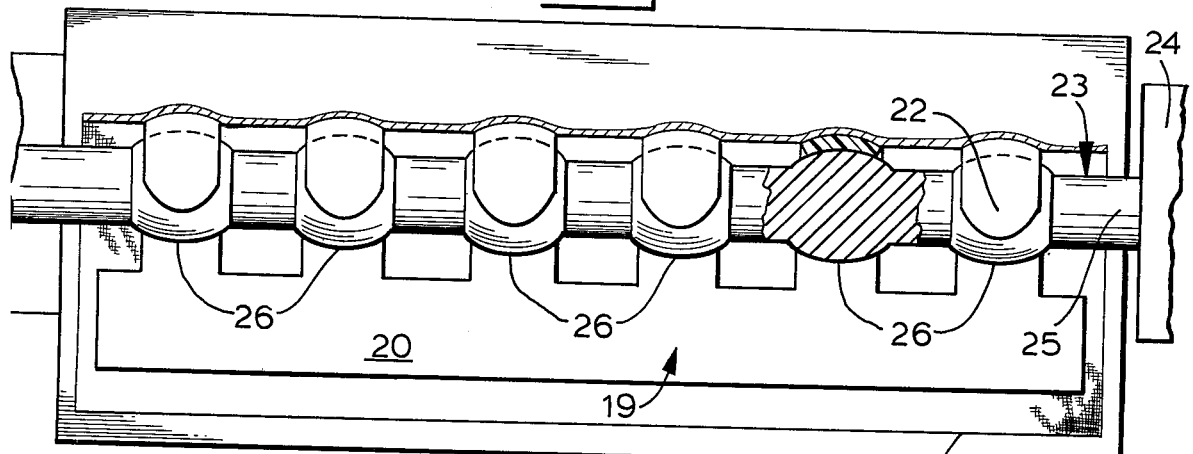
Fig. 6B
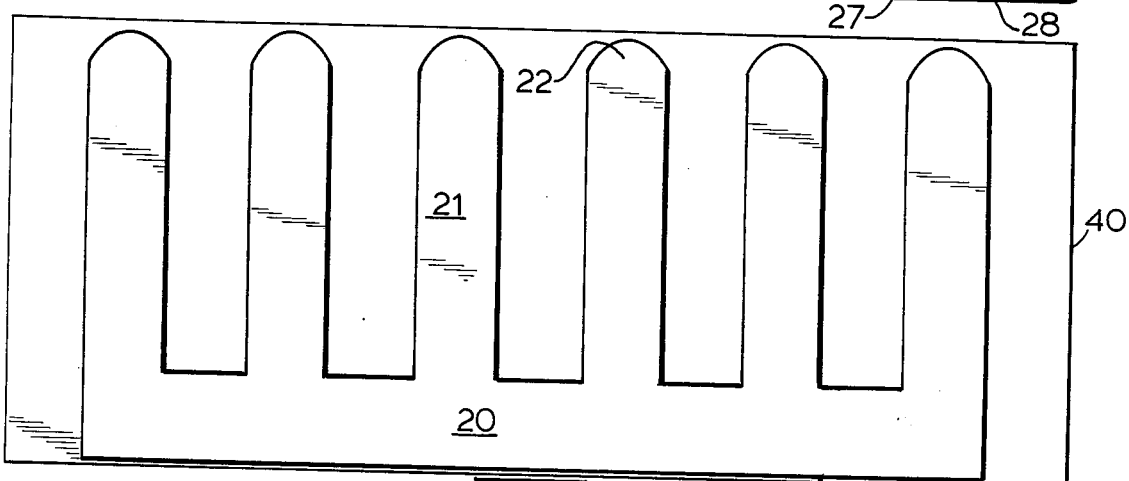
Fig. 6A
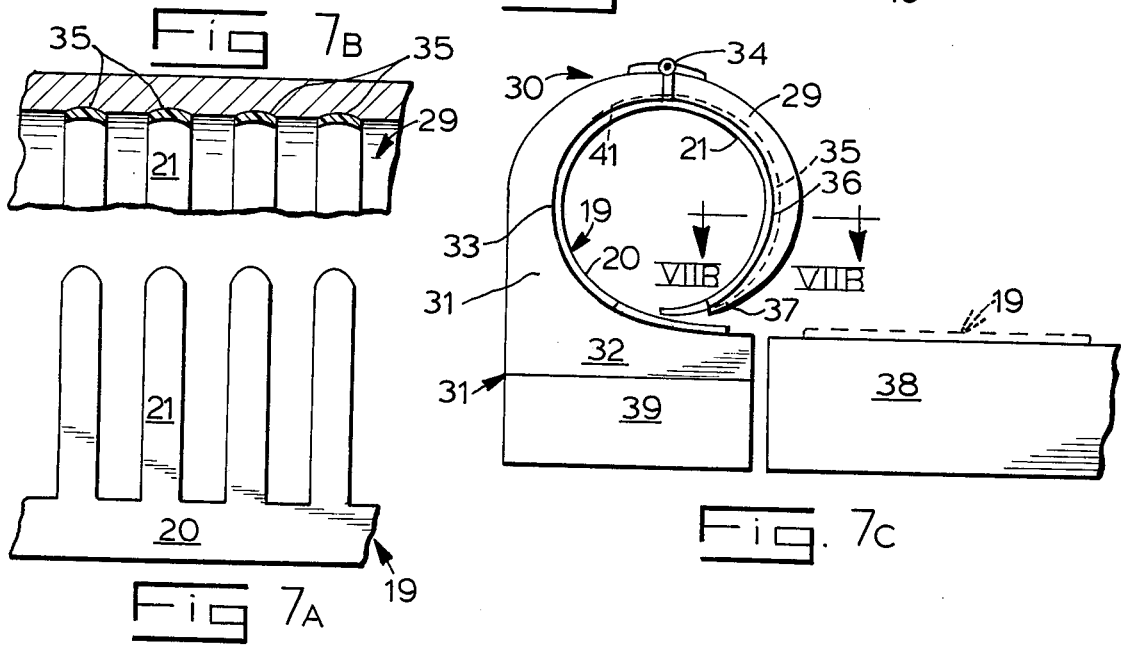
Fig. 7B
Fig. 7A
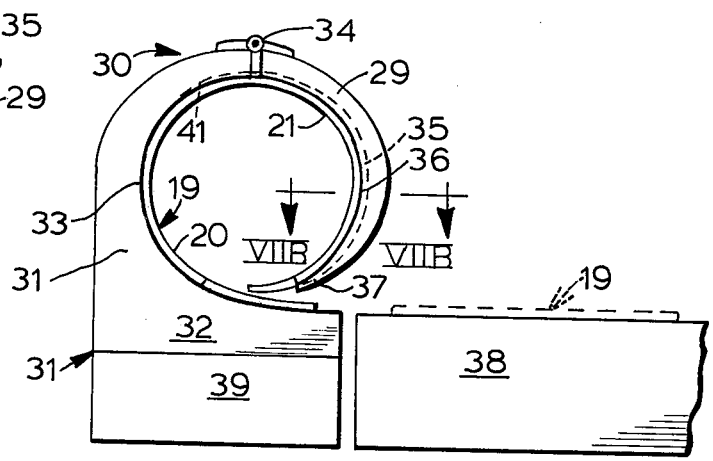
Fig. 7C

METHOD FOR PRODUCING A TRANSVERSELY CURVED FINGER BINDING

BACKGROUND OF THE INVENTION

This invention relates to a method for producing a plastic binding used for binding sheet materials or covers containing sheet materials.

Plastic bindings such as in U.S. Pat. No. 1,970,285 have been in use for many years. Most plastic bindings are fabricated of polyvinyl chloride either homo or as a co-polymer. One of the general problems that exist is a world-wide shortage of chemical feed stocks to produce such compounds. This naturally leads to higher costs which manufacturers hope to reduce. It is desirable, therefore, to make available, if possible, a plastic binding which is less costly but will still do the job for which it is intended. One manner of doing this would be to reduce the amount of material in a plastic binding. It would be desirable to accomplish this without sacrificing any of the strength or stiffness that is required.

Traditionally plastic bindings have been manually formed by relatively simple equipment as described in U.S. Pat. Nos. 2,211,743 and 2,211,744. Here a plastic blank is heated and formed around an arbor in conjunction with a cloth wrapper. After an appropriate dwell, the cloth is removed and a cooled and now-rolled plastic binding is stripped from the arbor. This produces bindings with fingers which essentially are straight transversely across the respective fingers. As noted above, such bindings lack sufficient strength, particularly if the amount of plastic binding material is minimized.

It is also known to provide automated binding producing machines such as U.S. Pat. No. 2,273,824 which employ tubular-shaped and split-openable dies with and without internal guiding arbors to produce plastic bindings at high rates of speed. Such binding machines produce bindings with fingers which essentially are also straight transversely across the respective fingers. Consequently, the similar problem exists in that sufficient strength is lacking when the amount of plastic material utilized is minimized.

SUMMARY OF THE INVENTION

It is an object of this invention to produce a plastic binding containing less material then previously used but still have the same strength and stiffness as required.

It is another object of the invention to provide a method for producing a plastic binding which is less costly than previous bindings. It is a further object of this invention to provide a method for producing a plastic binding with fingers having transverse arches, said transverse arches extending along the fingers until a transition point at a backbone portion of the binding connecting to the fingers.

According to the method of the invention, a plastic binding is produced having a plurality of circularly formed fingers extending from a backbone portion of the plastic binding, each finger having a strengthening curve transverse to its longitudinal axis. Initially, a flat plastic binding blank is provided having a backbone portion and a plurality of flat fingers integral with the backbone portion. The blank is heated to a temperature sufficient to soften the blank and then the fingers of the blank are curled and the backbone portion is curved so as to create a closed circular plastic binding formation by use of a guide form. Simultaneously, each of the fingers is curved transverse to its longitudinal axis by the guide form. The formation on the guide form is maintained during a cooling period and then the plastic binding is removed from the guide form.

BRIEF DESCRIPTION OF THE DRAWINGS

FIG. 1 is a perspective view of sheets of material held together by a plastic binding produced by the method of this invention.

FIG. 2 is a plan view of a portion of the plastic binding of FIG. 3 assembled onto a book edge.

FIG. 3 is a perspective view of the plastic binding of FIGS. 1 and 2 produced according to the invention wherein each finger has an arched cross-section.

FIG. 4 is a partial view taken along line IV—IV of FIG. 3.

FIG. 5 is a graph illustrating the increasing stiffness with an increasing amount of arch in individual fingers of a binding produced according to the invention as compared to a flat finger binding of the prior art.

FIG. 6A is a plan view of a thermal plastic blank used in the formation of the plastic binding of FIGS. 1 through 5.

FIG. 6B which is aligned with FIG. 6A is a plan view illustrating a method of producing the binding of FIGS. 1 through 5.

FIG. 7A is a plan view of a thermal plastic binding blank illustrated in conjunction with FIG. 7B showing a movable portion of a die utilized for producing the binding of FIGS. 1 through 5.

FIG. 7C is a side view illustrating a splitable tubular die partially shown in FIG. 7B which is used in another method of producing the binding of FIGS. 1 through 5.

DESCRIPTION OF THE PREFERRED EMBODIMENTS

Referring now to FIG. 1 of the drawings, a plastic binding 10 produced according to the invention is illustrated. The binding has a backbone portion 11 which is integral with a plurality of curled fingers 12. The fingers 12 retain sheets 13 between cover members 14 and 15.

As shown in FIGS. 2 and 3, each of the fingers have pointed free ends 16 and blend into the backbone portion 11 at a transition region 17. As most clearly seen in FIGS. 3 and 4, each of the fingers is arched so as to form an outer convex surface 18. This arch extends from the free ends 16 to the transition region 17 where the arch gradually disappears so as not to be present in the backbone portion 11. The arch forming the convex surface 18 has a height "h" and is transverse to the longitudinal line of the fingers.

Tests have been made in an experimental stiffness tester where individual flat finger bindings were deflected a fixed distance and the resistance to bending was measured. In these tests, for example, with plastic whose thickness measured 0.013 inches, 0.015 inches, 0.018 inches, 0.020 inches and 0.025 inches, transverse arching of the finger in the manner shown in FIG. 4 produced the following typical results. The distance h indicates the amount of arch.

0.006 inch arch was 7% stiffer
0.009 inch arch was 12% stiffer
0.026 inch arch was 28% stiffer Additional tests have confirmed the fact that finger stiffness is directly related to the amount of arch.

In FIG. 5 there is shown a graphical illustration of the tests referred to above and indicate, generally, that an increased arching of the finger increases the stiffness of the finger as compared with flat finger binding of the same thickness. Thus, for example, a ⅜ inch diameter finger binding whose nominal thickness is 0.018 inches has its stiffness increased by approximately 25% when arched 0.025 inches. The same size ⅜ inch diameter binding in its normal flat configuration has been used for many years to satisfactorily bind books in this size range. The tests indicate that the improved, arched, construction is 25% stronger than it needs to be in order to accomplish the same binding purpose. Conversely, a 25% reduction in thickness with an appropriate arching of the finger produces a satisfactory binding finger.

Thus, not only can a finger binding of the same strength be made with less material by transversely arching the finger, but the physical appearance of the new finger binding is different and has a more aesthetic appeal than the old, flat construction. A binding of this type can be manufactured by hand mandrel techniques as well as by automatic manufacture.

Although the plastic binding in its final form can be circumferentially formed so that the outside thereof is concave or dipped, such an arrangement is not preferred since the convex form provides the best aesthetic appearance for most purposes.

Referring now to FIGS. 6A, B and 7A, B, C the method of the invention for producing the plastic binding of FIGS. 1 through 5 will now be described.

As shown in FIG. 6A, a flat thermal plastic binding blank 19 is provided having a flat backbone portion 20 integral with flat fingers 21 extending from the backbone portion 20. The fingers have pointed free ends 22. Aligned with the blank of FIG. 6A is a winding spindle or arbor 23 shown in FIG. 6B. The spindle has a handle 24 connecting to a cylindrical shaft 25. A plurality of spaced curve forming portions 26 are provided on the cylindrical shaft 25. These are preferably machined portions formed to create a donut-shaped protrusion which surrounds the shaft 25. This is utilized for creating the arch in the fingers transverse to the longitudinal direction of the fingers. Alternatively, a concave recess would be provided if concave fingers would be preferred. However, as noted above, the convex form provides the best aesthetic appearance.

The spacing between the curve forming portions 26 corresponds with lateral spacing between the fingers. Accordingly, the blank is placed on a wrapping member such as a canvas cloth or blanket 27 and may be preheated there. A heating table or plate 28 is provided beneath the spindle 25 and blanket 27. A plate 40 or an extension of plate 28 preferably is provided beneath the thermal plastic blank 19 for preheating thereof. The blank is formed around the spindle 23 by a wrapping of the wrapping member around the spindle 23 as shown in FIG. 6B. The fingers during this wrapping step are aligned with the curve forming portions 26. Prior and during the wrapping, the blank has been heated sufficiently to soften the plastic blank to permit deformation thereof. As the blank is wrapped about the spindle by the blanket 27, the fingers are curled and simultaneously transversely arched. The backbone portion is also curved so as to form a closed loop with the fingers. The formed blank is then cooled. Thereafter, the spindle is removed and the formation of the plastic binding according to the method of the invention is complete.

Although the backbone portion 20 overlies the curve forming portions 26 and the spaces or gaps therebetween, the backbone portion 20 is not substantially curved by the portions 26. Since the backbone portion 20 is a continuous strip of material, it does not deform as easily as the individual fingers.

Another method of producing the binding according to the invention is disclosed in FIGS. 7A, 7B and 7C. In 7A, the flat plastic binding blank 19 is again illustrated. The fingers 21 are aligned with depressions or recesses 35 which function as curve forming portions. These curve forming portions produce the transverse arch in each of the fingers.

As shown in FIGS. 7B and 7C, a split section tubular die 30 is provided preferably having a fixed position die section 31 with a base portion 32 and a curved inner wall 33. A hinge 34 connects a movable die section 29 to the fixed die section 31. The movable die section 29 similarly has a curved inner wall 36 and elongated recesses 35 formed in and spaced along the inner wall 36. These recesses 35 function as the curve forming portions for creating the transverse arches in the fingers. They longitudinally extend from a tip portion 37 of the movable die section 29 to a point 41 corresponding to the transition region 17 of the binding shown in FIG. 2. They are spaced so as to conform with the spacing between fingers of the flat plastic binding. The tip portion 37 of the movable die section 29 is received in a lower portion of the inner wall of the fixed position die section 31 when the die section 29 is closed.

As shown in FIG. 7C, initially the blank 19 is preheated by use of a heating plate 38 and is inserted into the die so as to curl the fingers 21 and curve the backbone portion 20. Simultaneously, since the fingers 21 are aligned with the recesses 35, the fingers are simultaneously transversely arched. After a cooling period, the movable die section 29 is opened and the completed plastic binding is removed.

The spindle system 23 of FIG. 6B and the splittable tubular die system 30 of FIG. 7C may be constructed in a more detailed manner as shown in U.S. Pat. Nos. 2,211,743, 2,211,744 and 2,273,824, for example.

Athough various minor modifications may be suggested by those versed in the art, it should be understood that I wish to embody within the scope of the patent warranted hereon, all such embodiments as reasonably and properly come within the scope of my contribution to the art.

I claim as my invention:

1. A method for producing a plastic binding having a plurality of circularly formed fingers extending from a backbone portion of the plastic binding, each finger having a convex strengthening curve transverse to its longitudinal axis, comprising the steps of:
   (a) providing a flat plastic binding blank having a backbone portion and a plurality of flat fingers integral with and extending from the backbone portion;
   (b) heating the blank to a temperature sufficient to soften the plastic blank and permit deformation thereof;
   (c) providing a two section openable tubular die, at least one of the sections having on an inner wall thereof elongated spaced-apart concave curve forming recesses running transverse to a longitudinal axis of the die, a spacing between the curve forming recesses corresponding to a spacing of the fingers;
   (d) closing the die and inserting the blank into the closed die through an entranceway by lining up tips of the fingers with the curve forming recesses and sliding the tips along the recesses such that the fingers deform into the recesses during insertion so as to form the transverse strengthening curves in the fingers;

(e) cooling the formed blank; and (f) opening and removing the formed blank.

2. The method of claim 1 wherein a mandrel is not employed within the die for blank formation.

3. The method of claim 1 wherein the two sections of the die are hinged together at a top of the die to permit opening.

4. The method of claim 3 wherein the recesses extend a distance sufficient to curve the fingers from their free ends to a transition region at the backbone portion, the backbone portion not being curved transverse to the longitudinal axis of fingers.

* * * * *